United States Patent [19]

Eberle, Jr.

[11] Patent Number: 5,044,650
[45] Date of Patent: Sep. 3, 1991

[54] WHEELCHAIR HANDLE

[76] Inventor: Robert Eberle, Jr., P.O. Box 10, Dripping Springs, Tex. 78620-0010

[21] Appl. No.: 453,768

[22] Filed: Dec. 20, 1989

[51] Int. Cl.$^5$ .............................................. B62J 29/00
[52] U.S. Cl. .............................. 280/304.1; 280/655.1; 280/47.38; 297/183
[58] Field of Search .................. 280/304, 304.1, 304.5, 280/639, 647, 655.1, 47.371, 47.34, 47.38, 47.315, 655, 47.17, 47.25; 297/183, DIG. 4; 16/114 R, 111 R

[56] References Cited

U.S. PATENT DOCUMENTS

| | | | |
|---|---|---|---|
| 1,063,884 | 6/1913 | Kern | 280/47.38 |
| 1,145,471 | 7/1915 | Dobrick | 16/111 R |
| 2,612,209 | 9/1952 | Alldredge et al. | 297/DIG. 4 X |
| 2,823,925 | 2/1958 | Withers | 280/47.38 |
| 2,921,326 | 1/1960 | Lautmann | 16/114 R X |
| 3,084,949 | 4/1963 | Forster et al. | 280/655.1 X |
| 3,619,852 | 11/1971 | Eckberg | 16/114 |
| 4,896,897 | 1/1990 | Wilhelm | 280/655 |

Primary Examiner—Charles A. Marmor
Assistant Examiner—Mitchell Bompey
Attorney, Agent, or Firm—Johnson & Gibbs

[57] ABSTRACT

A removable wheelchair handle for mounting on a wheelchair to permit an attendant to maneuver the wheelchair from a location behind and above the back of the wheelchair inlcuding a handgrip cross bar, a support post connected with each end of the crossbar, mounting members connected with the support posts in spaced parallel relation and having mounting pins at the distal ends for insertion into open ends of handles on the wheelchair. One embodiment of the removable handle is formed by two telescopically connected elbow members which form the handgrip crossbar and portions of spaced mounting posts at opposite ends of the crossbar and the other portions of the mounting posts and mounting members connected to the ends of the mounting posts are formed by two elbow members telescopically connected with the first two elbow members. A further embodiment of the removable handle has spring loaded latch pins and latch holes in the elbow members at each of the connections between the elbows for adjusting the distance between the mounting members and adjusting the height of the handgrip crossbar.

4 Claims, 2 Drawing Sheets

WHEELCHAIR HANDLE

BACKGROUND OF THE INVENTION

This invention relates to wheelchair handles and more particularly relates to removable handles for wheelchairs.

Wheelchairs are made in a wide variety of sizes and styles. Most wheelchairs include two laterally spaced parallel handles extending rearwardly from the upper end of the back of the chair, such, for example, as illustrated in the Rodaway U.S. Pat. No. 3,881,773 issued May 5, 1975. Such handles normally are rubber handgrips mounted on tubular end portions of frame members on opposite sides of the back of the wheelchair. For maximum control and maneuverability of such a wheelchair, a person pushing the chair must grip both of the handles. One-hand operation of such a wheelchair is not safe and does not provide for the maneuverability normally required. Other forms of wheelchairs which include a one piece handle normally do not position the hand gripping portions of the handle at a location which provides for maximum leverage for the maneuverability desired when the person pushing the wheelchair is using only one hand. Such wheelchairs are illustrated in patents to Riikonen, U.S. Pat. No. 4,679,816, issued July 14, 1987, to Fenwick, U.S. Pat. No. 4,598,921, issued July 8, 1986, and to Girvin, U.S. Pat. No. 4,786,072, issued Nov. 22, 1988. Further, these one piece handles are not removable and foldable.

SUMMARY OF THE INVENTION

It is a particularly important object of the invention to provide a new and improved wheelchair handle.

It is another object of the invention to provide a wheelchair handle which permits one-hand operation of a wheelchair by a person pushing the chair.

It is another object of the invention to provide a wheelchair handle having a hand gripping portion located to provide maximum leverage and control of a wheelchair when operating the chair with one hand.

It is another object of the invention to provide a removable wheelchair handle.

It is a still further object of the invention to provide a removable wheelchair handle which may be disassembled and/or folded to facilitate packing the handle.

In accordance with the invention, there is provided a removable handle for wheelchairs to permit one-handed operation of the wheelchair by a companion or attendant and improve the maneuverability of the wheelchair. The handle is an articulated assembly having a central handgrip crossbar, parallel support post portions formed integral with opposite ends of the crossbar extending in the same direction from the crossbar and mounting bar portions connected with each of the support post portions in parallel spaced relation with each other, each mounting bar portion having a reduced distal end section extending from an annular stop flange spaced from the end thereof. The handle may be made in several sections to facilitate disassembly and/or folding. In each form, the handle assembly the sections telescope together when assembled. One form of the invention includes spring loaded lock pins which are provided in some sections of the handle assembly for latching in holes provided in other sections to permit adjustments in the width of the handle assembly and in the height of the crossbar.

Other objects and advantages of the invention will be apparent from the following detailed description in conjunction with the accompanying drawings.

DETAILED DESCRIPTION OF THE INVENTION

Figure 1:
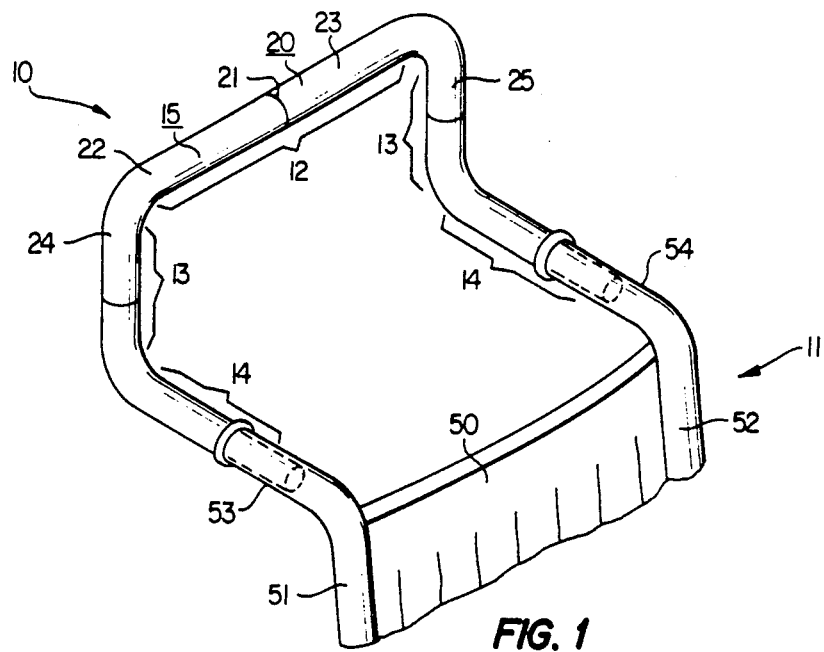
FIG. 1 is a perspective view of one embodiment of the handle of the invention installed on a wheelchair illustrated in fragmentary forms.
Figure 2:
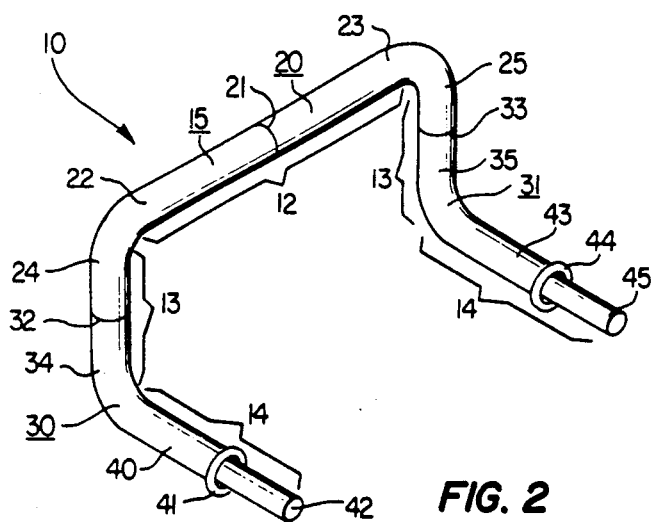
FIG. 2 is a perspective view of the handle shown in FIG. 1 removed from the wheelchair.
Figure 3:
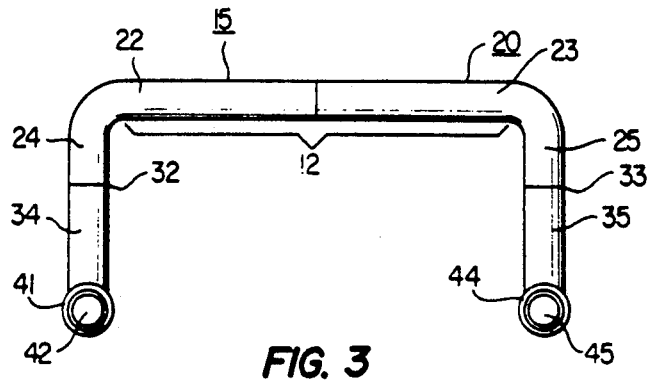
FIG. 3 is a front view in elevation of the handle of FIG. 2.
Figure 4:
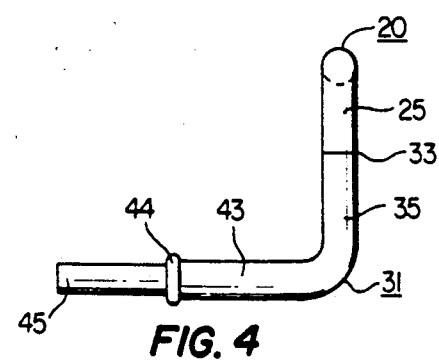
FIG. 4 is a right end view in elevation of the handle of FIGS. 1-3.
Figure 5:
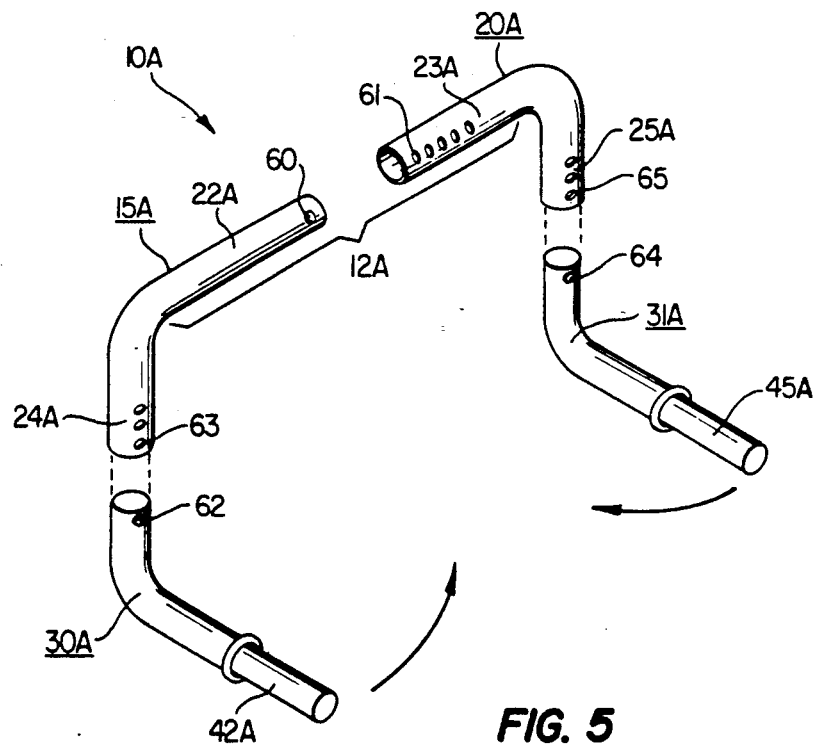
FIG. 5 is an exploded perspective view of another embodiment of the handle of the invention.
Figure 6:
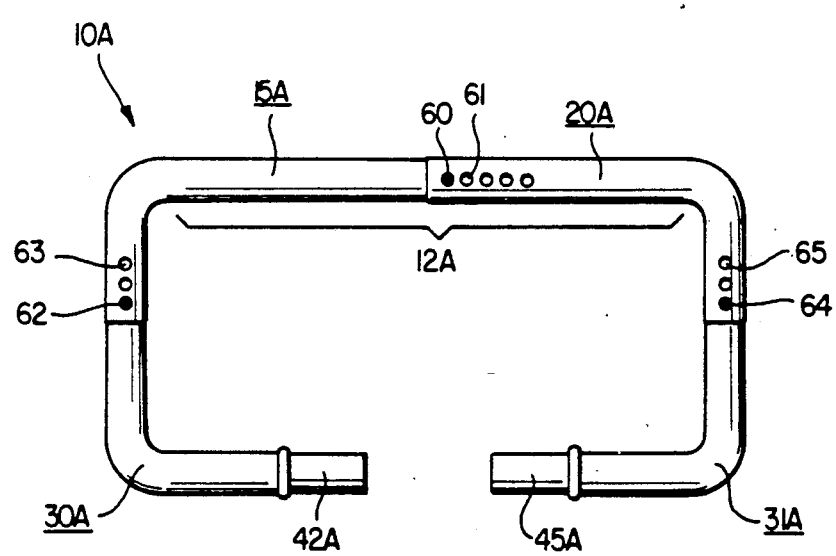
FIG. 6 is a plan view of the handle of FIG. 5 assembled and folded.

Referring to FIG. 1, a removable handle 10 embodying the features of the invention is installed on a wheelchair 11. FIG. 2 shows the handle 10 assembled as in FIG. 1 and removed from the wheelchair. Basically, the handle 10 is a jointed, articulated assembly which may be disassembled or folded for storage purposes. The handle 10 is preferably constructed of tubular elbow sections which are assembled in a fixed relationship of a defined size as illustrated in FIGS. 1-4, or alternatively, an adjustable assembly as illustrated in FIGS. 5 and 6. The removable handle 10 comprises: a hand grip crossbar 12 which is supported in an elevated position behind the wheelchair 11 by upright posts 13 connected with mounting bars 14 designed along distal free ends for insertion into and coupling with the handles of the wheelchair 11. The articulated structure of the removable wheelchair handle 10 includes 90 degree elbow members 15 and 20 joined together at 21. The elbow members 15 and 20 have handgrip portions 22 and 23, respectively, which form the handgrip crossbar 12. The joint 21 between the elbows 15 and 20 is a telescoping joint formed by the end portion of one of the elbows being slightly smaller than the end portion of the other elbow, so that the two members will telescope together in a sufficiently tight relationship to hold them together during use of the handle. The elbow members 15 and 20 also have post sections 24 and 25, respectively, which extend essentially perpendicular to the elbow sections 22 and 23 and lie in a common plane parallel with each other in the assembled relationship of the handle as shown in FIG. 1. Elbow members 30 and 31, which may be 90 degree elbows or may be made with angles of greater or less than 90 degrees, as desired, are connected with the elbow members 15 and 20, respectively, at joints 32 and 33. The elbows 30 and 31 are connected with the elbows 15 and 23 so that the elbows 30 and 31 extend in the same direction in parallel spaced apart relationship. The elbow 30 includes an upwardly extending post portion 34 which connects with the post portion 24 of the elbow 15. The portions 24 and 34 telescope together at the joint 32 with one of the end sections being slightly smaller than the other, so that a tight fit will be formed at the connection 32. Similarly, the elbow 31 has an upwardly extending post portion 35 which connects with the post portion 25 of the elbow 20 at the coupling 33. The elbow portions 25 and 35 telescope together in a tightly fitting relationship by forming one of the ends slightly smaller than the other. The support member 14 of the elbow member 30 is an integral part of the elbow formed by an essentially horizontal portion 40 and an annular enlargement or stop flange 41 and end pin portion 42 which may be equal in diameter to the portion 40 or of a reduced diameter. Similarly, the support member 14 of the elbow 31 has a portion 43, an enlargement or stop flange 44, and end pin 45.

The wheelchair 11 is typical of available wheelchairs having a back 50 mounted between vertical back right and left posts 5 and 52. The right post has an integral right handle 53 and the left post 52 has an integral left handle 54. The right and left handles 53 and 54 are bent to an angle positioning the handles approximately horizontal when the wheelchair is in operation. The handles 53 and 54 are tubular having open ends. Normally the handles will be fitted with rubber handgrips which are grasped by an attendant or companion who is pushing the wheelchair. For purposes of illustration, the handgrips are not shown in FIG. 1. Such hand grips normally will either be closed or partially closed over the open ends of the wheelchair handles 53 and 54. In order to mount the removable wheelchair handle 10, the closed ends of the hand grips are cut off to provide access into the tubular bore of the handles 53 and 54.

The removable wheelchair handle 10 of the invention is installed on the wheelchair 11 after removal of the end closures of the rubber handgrips on the handles 53 and 54 of the wheelchair, as previously discussed. The mounting pins 42 and 45 of the handle 10 are inserted into the open ends of the wheelchair handles 53 and 54, respectively. The handle 10 is pushed forward relative to the wheelchair until the stop flange 41 on the pin 42 engages the end edge of the right wheelchair handle 53 and the stop flange 44 on the pin 45 engages the end edge of the left wheelchair handle 54. The outer diameter of the pins 42 and 45 is sized to fit tightly within the handles 53 and 54 so that the removable wheelchair handle 10 will be securely mounted on the wheelchair 11. With the handle so mounted, the handgrip crossbar 12 of the handle is behind and elevated well above the wheelchair 11 so that an attendant operating the wheelchair with a person in the chair can maneuver the chair with one hand and has sufficient leverage to safely and easily operate the chair.

FIGS. 5 and 6 illustrate an alternative embodiment of the removable wheelchair handle of the invention which is adjustable. Referring to FIG. 5, the handle 10A is formed by elbow members 15A and 20A and elbow members 30A and 31A. The handle 10A is adjustable both laterally and vertically to adapt the handle to wheelchairs having different distances between the wheelchair handles 53 and 54 and to raise and lower the handgrip crossbar 12A. The portion 22A of the elbow member 15A telescopes into the end of the portion 23A of the elbow member 20A. The elbow portion 22A has a spring loaded latch button 60 which is engageable with one of a plurality of latching holes 61 spaced along the elbow portion 23A for latching the two elbow 15A and 20A at four different positions in the embodiment illustrated to vary the width of the handle 10A. Similarly, the elbow member 30A telescopes into the elbow section 24A of the elbow 15A and has a spring loaded latch button 62 which is engageable with one of a plurality of latch holes 63 in the elbow section 24A. The elbow 31A telescopes into the section 25A of the elbow 20A. The elbow 31A has a spring loaded latch button 64 which is engageable with any one of several latch holes 65 in the section 25A of the elbow 20A. The elbows 15A, 20A, 30A, and 31A are assembled to provide the removable wheelchair handle 10A. The assembled handle 10A essentially resembles the assembled handle 10 as shown in FIG. 2 and is installed on the wheelchair 11 in the relationship illustrated in FIG. 1. The adjustable features of the handle 10A permit the handle to fit wheelchairs of differing distances between the wheelchair handles 53 and 54. Also, the handgrip crossbar 12A of the handle 10A may be adjusted at different heights. The different adjustments are simply made by depressing the latch button 60 at the joint with the elbow 20A and the latch buttons 62 and 64 in the elbows 30A and 31A, respectively. When the latch button is depressed, the particular member in which the latch button is located is telescoped inwardly into the connecting elbow to the desired latch hole for the adjustment required. The handle 10A is removed from the wheelchair by pulling the handle away from the back of the wheelchair extracting the pins 42A and 45A from the wheelchair handles 53 and 54. The handle 10A may be then disassembled into the four elbows 15A, 20A, 30A, and 31A. If desired the handle 10A may be folded essentially flat or into one plane by depressing the latch buttons 62 and 64 and rotating the elbow members 30A and 31A inwardly in the direction of the arrows as shown in FIG. 5, folding the handle essentially flat as represented in FIG. 6.

It will be recognized that the removable handle 10 illustrated in FIGS. 1–4 may also be disassembled into the four elbow members 15, 20, 30, and 31, and alternatively, the elbows forming the removable handle 10 may be folded by turning the members 30 and 31 inwardly, as discussed with respect to the handle 10A, to form an essentially flat assembled handle.

While the couplings between the several elbow members which form the removable wheelchair handles of the invention have been described in terms of specific connections which telescope together and are adjustable and latchable at several different widths and handle heights, as in the case of handle 10A, it will be recognized that other standard forms of connecting tubular members together which will also permit relative rotation of the tubular members may be employed within the scope of the invention.

It will be recognized that a new and improved portable or removable wheelchair handle has been described and illustrated. The handle may be made with fixed dimensions or in an assembly which is adjustable both from a width and a height standpoint. The handle is readily attached to a wheelchair and provides for one-hand control and maneuvering of the wheelchair.

It will also be recognized that while the embodiments of the removable wheelchair handle have been illustrated as a jointed or articulated assembly which may be disassembled for easy packing and handling, a handle having the shape of the assemblies illustrated and described may be made in a removable one piece form.

What is claimed is:

1. A removable wheelchair handle for mounting on a wheelchair for operation of the wheelchair by an attendant from a location behind and above the back of the wheelchair comprising:
a hand grip crossbar;
laterally spaced parallel support posts connected at first ends with opposite ends of said crossbar at an angle of at least 90 degrees with said crossbar and extending in the same direction from said crossbar for supporting said crossbar in predetermined spaced relation relative to said wheelchair;

spaced parallel mounting members connected at first ends with and at a minimum of 90 degree angles relative second ends of to said support posts and extending in the same direction from said posts;

a mounting pin on each second end of each of said mounting members extending along the axis of each said mounting member, each mounting pin being sized to fit into an open end of a handle on the wheelchair, said mounting pins being positioned relative to said crossbar to support said crossbar behind and above said wheelchair when said removable handle is mounted on said wheelchair;

stop means on each of said mounting members spaced from the end of the mounting pin on said mounting member to engage the end edge of the wheelchair handle in which said mounting pin is inserted when said removable handle is mounted on said wheelchair; and each half of said crossbar and a portion of each of said support posts comprising an elbow and each said mounting member and another portion of each of said support posts comprising an elbow, said elbows forming said crossbar telescoping together at substantially the center of and to form said crossbar, and each of said mounting members and the portion of each of said support posts formed with each said mounting member telescoping together with the portion of said support posts formed integral with half of said crossbar, each of said elbows being a 90 degree elbow.

2. A removable wheelchair handle for mounting on a wheelchair to provide a handgrip crossbar behind and above said wheelchair comprising:

two 90 degree elbow shaped tubular members secured together along first portions of said members in a tightly fitting telescoping connection forming a handgrip crossbar of said handle and opposite end portions of said elbow members extending in parallel relation at substantially 90 degree angles with said first end portions of said elbow members forming first portions of spaced parallel support posts for said handgrip crossbar, a 90 degree elbow shaped mounting member having a support post portion tightly telescopically engaged with each support post portion of said first mentioned elbow members, each of second mentioned elbow members having support member portions in parallel spaced relation with each other and each provided with distal end mounting pin portions insertible into open ends of handles on said wheelchair, and external annular stop flanges on each of said support members at each of said mounting pins for limiting the distance each of said mounting pins is insertible into said wheelchair handles.

3. A removable wheelchair handle in accordance with claim 2 wherein said first elbows forming said handgrip crossbar and said first portions of said mounting posts lie in a first plane and said second elbows including said support members lie in parallel spaced planes extending perpendicular to said first plane in which said handgrip crossbar is positioned.

4. A removable wheelchair handle in accordance with claim 3 wherein of said telescoping connections between said elbow members is an adjustable connection comprising:

a spring loaded latch pin in one inner elbow portion at each connection and a plurality of longitudinally spaced latch holes in an outer portion of each elbow connection.

* * * * *